United States Patent

Borasio et al.

Patent Number: 5,658,112
Date of Patent: Aug. 19, 1997

[54] PROCESS FOR MANUFACTURING A SINGLE COMPONENT COVER FOR OIL FILTERS FOR VEHICLES

[75] Inventors: Franco Borasio, Desana; Sergio Fassio, Collegno, both of Italy

[73] Assignee: Tecnocar S.R.L., Turin, Italy

[21] Appl. No.: 562,896

[22] PCT Filed: May 16, 1995

[86] PCT No.: PCT/EP95/01857

§ 371 Date: Nov. 27, 1995

§ 102(e) Date: Nov. 27, 1995

[87] PCT Pub. No.: WO95/32042

PCT Pub. Date: Nov. 30, 1995

[30] Foreign Application Priority Data

May 20, 1994 [IT] Italy .................................. TO94A0401
May 20, 1994 [IT] Italy .................................. TO94A0402

[51] Int. Cl.⁶ .................................................. B21D 51/44
[52] U.S. Cl. ..................................... 413/4; 413/8; 72/333; 72/348; 72/256; 210/440
[58] Field of Search ............................. 72/333, 332, 324, 72/348, 256, 341; 29/896.62, 509; 413/4, 8, 2; 210/440, DIG. 17

[56] References Cited

U.S. PATENT DOCUMENTS

| | | | |
|---|---|---|---|
| 2,460,721 | 2/1949 | Thompson | 72/333 |
| 2,980,993 | 4/1961 | Lyon | 72/348 |
| 4,421,444 | 12/1983 | Hanley | 413/4 |
| 5,295,304 | 3/1994 | Ashley, Jr. | 29/894.325 |

FOREIGN PATENT DOCUMENTS

| | | | |
|---|---|---|---|
| 88121647 | 12/1988 | European Pat. Off. . | |
| 2140551 | 3/1992 | Germany . | |
| 1274806 | 12/1986 | U.S.S.R. | 72/333 |
| PCT/GB90/01123 | 7/1990 | WIPO . | |

*Primary Examiner*—Daniel C. Crane
*Attorney, Agent, or Firm*—Paul & Paul

[57] ABSTRACT

There is described a process for manufacturing a single-component cover (10) for filters for vehicles substantially comprising the steps of: providing a starting single-component slab (10); drawing the slab (10) in the central part (34) thereof; reducing the thickness of the external edge (30) of the slab (10), by a bending step followed by a drawing step and three further bending steps, and by trimming the external edge (30); finally forming the external edge (30); punching the slab (10) in the central part (40) thereof; turning the edge in the central drawn part (40) of the slab (10); threading this central hole (42); and seaming the external edge (30) of the slab (10) to a filter-containing cup (14). (FIG. 1)

10 Claims, 6 Drawing Sheets

PROCESS FOR MANUFACTURING A SINGLE COMPONENT COVER FOR OIL FILTERS FOR VEHICLES

The present invention refers to a process for manufacturing a single-component cover for filters for vehicles, particularly for oil filters, and to the cover produced through this process.

FIGS. 1 to 3 show a cover 10 produced according to the prior art, to be used on an oil filter to cover it according to well-known operating techniques and principles.

In particular, the cover 10 is composed of a central part 11 of a circular shape, and centrally open in order to form a threaded opening 12, through which the filter will be screwed to the block. The cover is then equipped with a thinner external ring 13, that is used for seaming to the cup 14 containing the filtering cartridge. Such seaming occurs at point 16 shown in FIG. 3.

The cover is then equipped, in a known way, with a plurality of holes 18 for the passage of oil.

The cover 10 must have two well-defined operating properties:

1) the thickness of the cover 10 itself must be adequately high (of the order of 1.7/3 mm) in the central threaded part 12 thereof, to support high pressures occurring during its operation; in particular, the cover 10, during design, must be resistant to bursts to which it is subjected during pulsating tests;

2) the thickness of the cover 10 must instead be adequately thin (of the order of 0.8 mm) in the external annular part thereof, where the cover 10 must be bent in order to seam it to the filter cup 14, so that the filter itself can be completely closed.

In order to realize a cover having two different thicknesses, applying the prior art, two different components are used, of materials commonly known as P04 and P13, where the two numbers following letter P are determined by the different carbon compositions therein and by other properties. The P04 component, about 0.6 m thick, is normally used to make the external ring 13, while the P13 component, about 2.5 mm thick, is normally used to make the central threaded part 12 of the cover 10. The two components, separately produced with two known pressing processes, are then welded together, through a third welding process, at points 20 and 22 in FIG. 2. As appears from what has been described before, the procedure to produce covers for oil and other types of filters has always been cumbersome and costly, since it employs two different types of material and several intermediate steps.

Purpose of the present invention is solving the above-said problems, providing a process for manufacturing a cover for oil filters and other types of filters that meets the above-listed operating requirements, and at the same time can be manufactured using a single starting component or blank and employing a unique, linear procedure that can be easily realized and has a reduced cost.

This cost reduction is obtained also because the manufactured product does not need any heat treatment.

The above and other purposes and advantages of the invention, such as those resulting from the description below, are obtained through a process for manufacturing a single-component cover for filters for vehicles, particularly for oil filters, as claimed in claim 1.

The present invention also relates to the cover produced through one of the above-listed processes: this cover shows the advantages of a high resistance to pressures and of an easy seaming and it is simple and inexpensive to manufacture, since it does not require any heat treatment. The cover can be used both for fuel filters and for oil filters for vehicles.

The present invention will be better described by some preferred embodiments thereof, given as a non limiting example, with reference to the enclosed drawings, in which:

FIGS. 1 to 3 show a cover 10 for oil filters according to the prior art and have been previously described.

The inventive process for manufacturing a cover 10 for filters using a single component begins by providing a starting single-component slab 10 of a circular shape (or of any other shape useful to manufacture covers for filters). This slab 10 is composed of a material whose thickness varies between 1.7 mm and 3 mm, depending on the filter size; this thickness is the necessary one to stand the high operating pressures.

Figure 1:
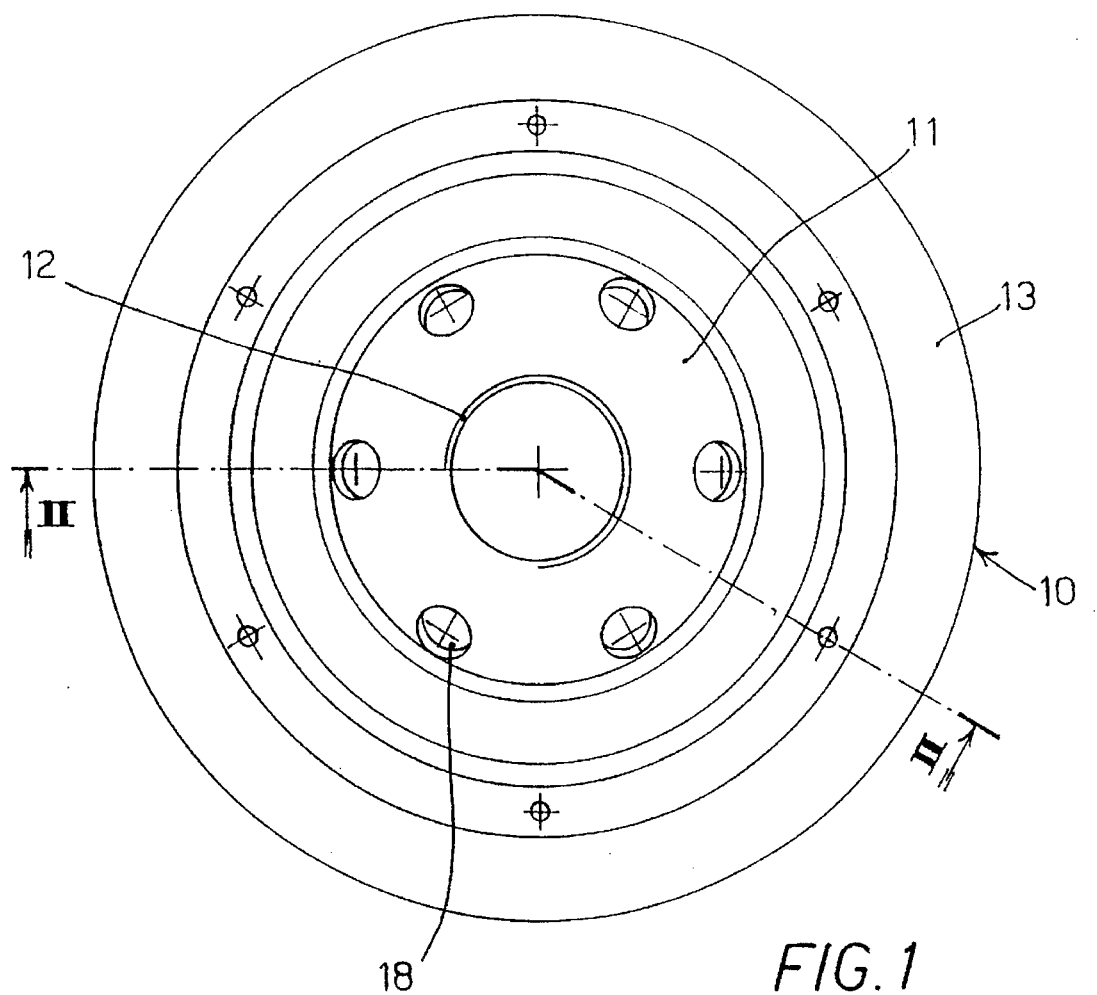
FIG. 1 is a top view of a cover for an oil filter for vehicles.
Figure 2:
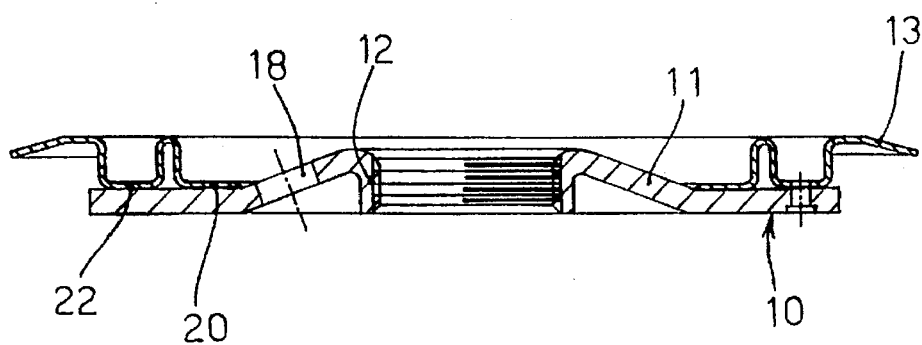
FIG. 2 is a side-sectional view of the cover according to the prior art, carried out along line II—II in FIG. 1.
Figure 3:
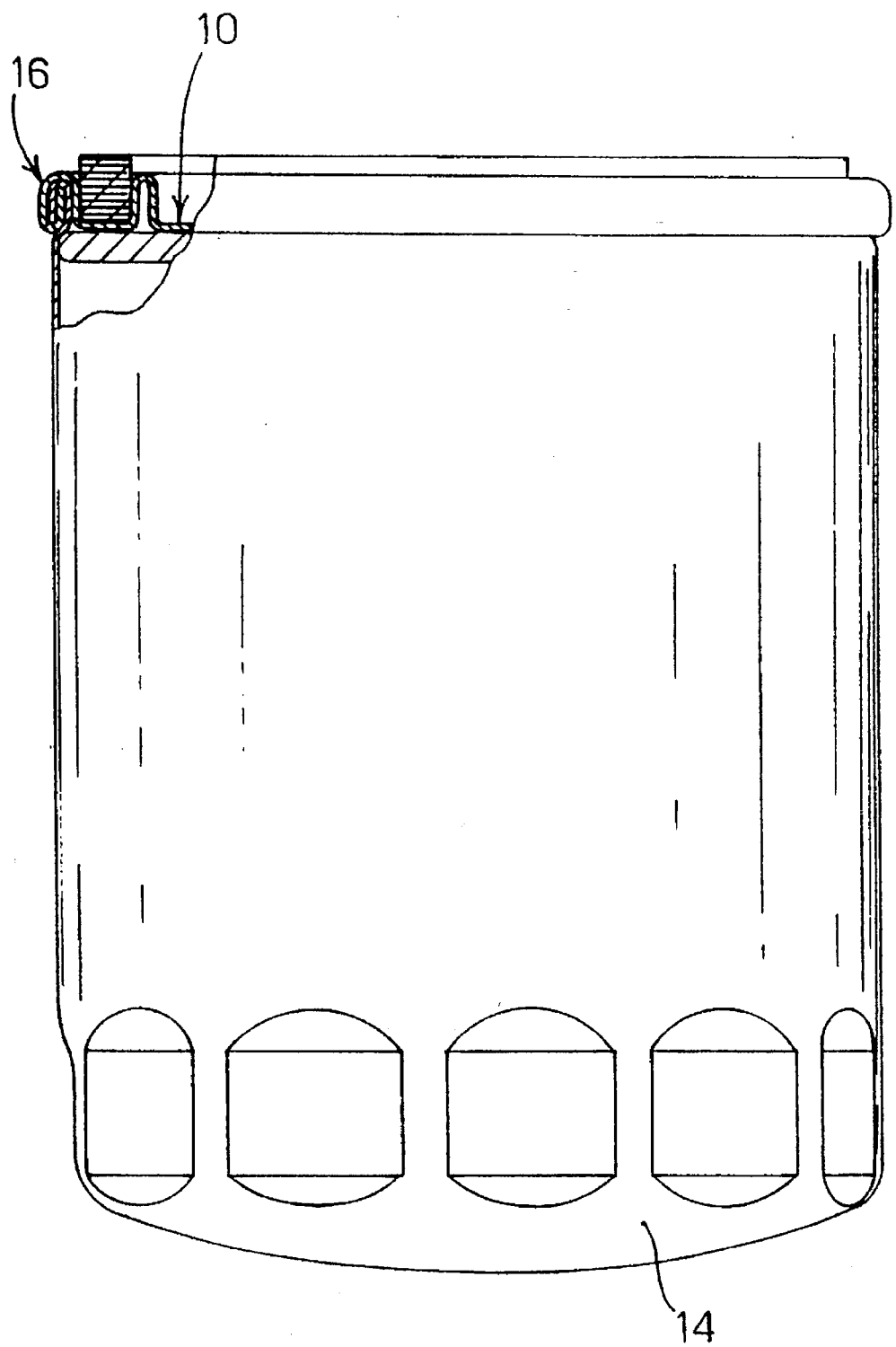
FIG. 3 is a side view of an oil filter for vehicles with the cover of FIG. 1 seamed to the filter containing cup.
Figure 4:
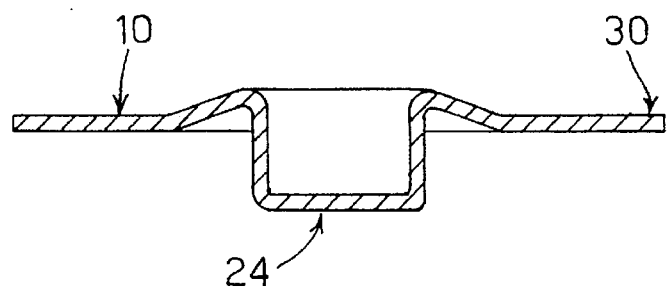
FIGS. 4 to 7 show the successive steps of a first alternative process for manufacturing covers for filters according to the present invention.

In order to obtain the two above-said operating thickness measures, according to a first alternative process of the invention (shown in FIGS. 4 to 7 and 8), firstly a drawing operation is carried out, by means of a press, to the slab 10 in the part 24 thereof corresponding to the central hole, as shown in FIG. 4. At this stage, thickness is not critical.

Figure 5:
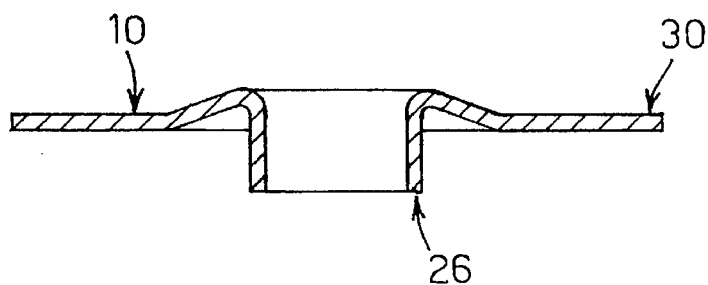

Then, by means of a press, trimming in 26 of the central drawn part 24 of the slab 10 is carried out, as shown in FIG. 5: through this trimming operation, thickness in 26 is reduced to about 1 mm.

Bending is then carried out in 28, by means of a press, of the trimmed part on itself and then squashing is performed, always by means of a press, of the bent part in 28 against the internal wall itself previously obtained through drawing. Purpose of these two operations, shown in FIG. 6, is increasing thickness in the central part 12 to the required 2.5 mm, and they strengthen the area where threading will be carried out.

Figure 6:
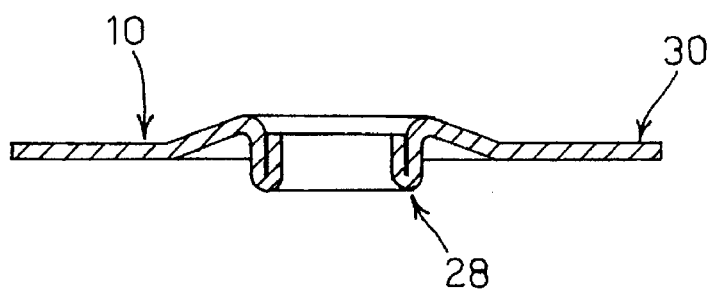

It is possible, in practice, to carry out this bending operation in two ways, one of which is shown in FIG. 6: bending is carried out in such a way as to generate a bend with upward-oriented concavity (FIG. 6) or with downward-oriented concavity (not shown) with the result of creating a reinforcing bead next to the central part 12. This bending step is always followed by a squashing step to complete such step.

Figure 7:
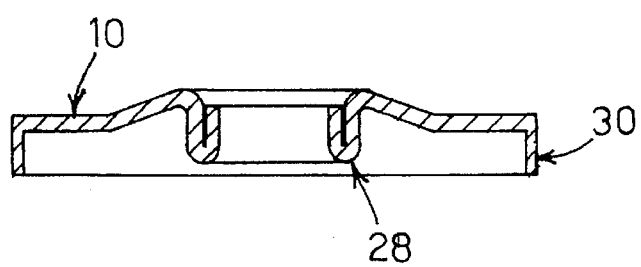

After having solved the thickness problem in the central part 12, the edge-bending step of the external edge 30 of the slab 10 is carried out reducing the external thickness thereof to 0.8 mm, through a material-stretching operation: this step is shown in FIG. 7. In this way, thickness reduction on the external edge 30 is also carried out and the desired single-component cover for filters is obtained.

The last manufacturing steps for such cover are then carried out in a known way: they are threading the central part 12 of the slab 10, and seaming the external edge 30 of the slab 10 to the filter-containing cup 14. These operations, being well known in the art, have not been described.

Thickness reduction of the external edge 30 of the slab 10 can also be realized in an alternative way, using a variation of the inventive process, variation according to which the bending and squashing step 4) (FIG. 6) and the bending and stretching step 5) of the external edge 30 (FIG. 7) are replaced by the redrawing step of the external edge 30 itself, reducing the external thickness thereof through at least 5 successive pressing stages.

Figure 8:
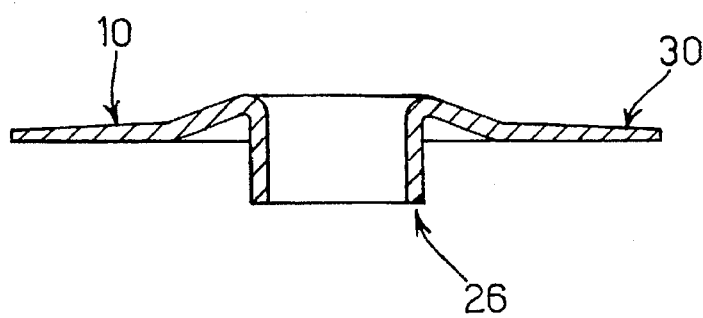
FIG. 8 shows one of the steps of a variation of the process for manufacturing covers for filters according to the present invention.

This last step is shown in FIG. 8 and allows bringing the initial thickness of the slab 10, that in this variation is equal to about 2 mm, to the 0.8 mm required for seaming. As shown in FIG. 8, bending of the central trimmed part 26 is no more necessary, since it already has such a thickness as to satisfy the operating requirements.

Figure 9:
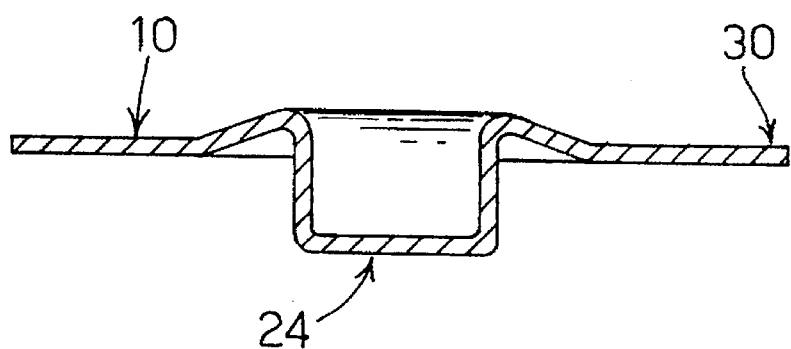
FIGS. 9 to 11 show the successive steps of a second alternative process for manufacturing covers for filters according to the present invention.
Figure 10:
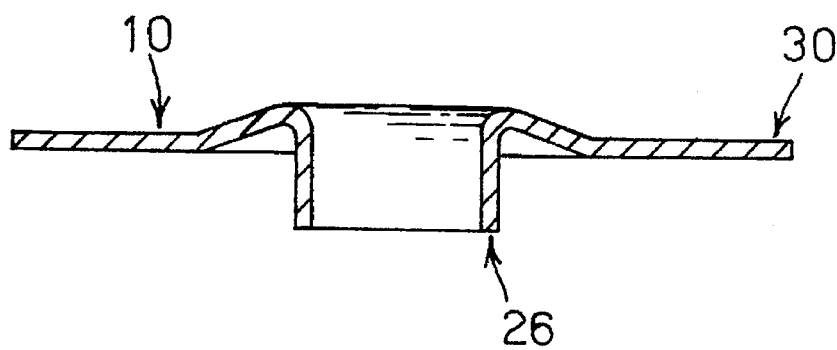
Figure 11:
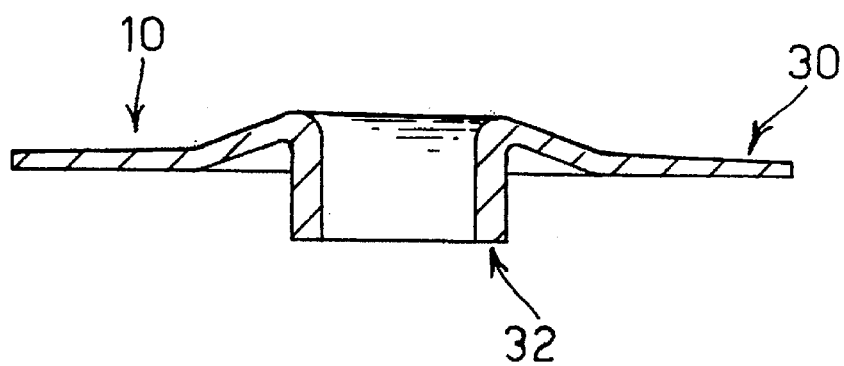
Figure 12:
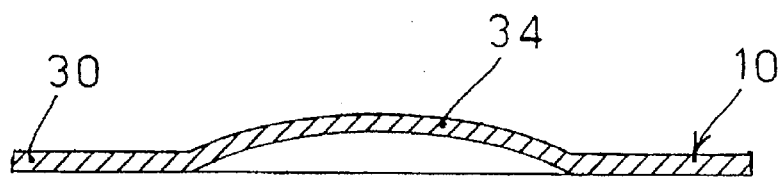
FIGS. 12 to 22 show the successive steps of a third alternative process for manufacturing covers for filters according to the present invention.
Figure 13:
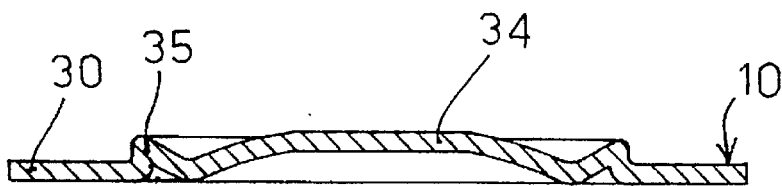

According to a second alternative process for manufacturing filters for vehicles, shown in FIGS. 9 to 11, after having provided the starting single-component slab 10, the process begins by carrying out a drawing operation, by means of a press, to the slab 10 in the part 24 thereof corresponding to the central hole, as shown in FIG. 9. At this stage, thickness is not critical and is reduced to about 1 mm.

Then, by means of a press, trimming in 26 of the central drawn part 24 of the slab 10 is carried out, as shown in FIG. 10: after this trimming operation, thickness in 26 remains reduced to about 1 mm and becomes critical.

Upsetting or heading the slab 10 is then carried out, by means of upsetting wheels, starting from the external circumferential edge 30 thereof, as shown in FIG. 11. The upsetting step consists in moving the material from the external edge 30 towards the central trimmed part 32 through a plurality of successive passes. Finally, a thickness decrease is obtained in the external edge 30 of the slab down to approximately 1 mm. and a thickness increase in the central trimmed part 32 of the slab up to approximately 1.5 mm, making these two thicknesses suitable to be operatively used.

According to a variation (not shown) of this second alternative process, the above-said upsetting or heading step is carried out before the drawing and trimming steps, without affecting in any way efficiency and optimum yield of the process itself, and without any modification of the final product being made.

According to another variation (not shown) of this second alternative process, the above-said upsetting or rolling step is carried out through drawing without moving material towards the central part of the slab 10, which thereby does not increase its thickness.

The last manufacturing steps for such cover are similar to the ones described above: they are threading the central part 32 of the slab 10, and seaming the external edge 30 of the slab 10 to the filter-containing cup 14. These operations, being well known in the art, have not been described.

According to a third alternative process (that is also the preferred one) for manufacturing filters for vehicles, shown in FIGS. 12 to 22, after having provided the starting single-component slab 10, the process begins by carrying out a drawing operation (shown in FIG. 12), by means of a press, of the slab 10 in the central part 34 thereof. This drawing provides the "dome" shape, improving operating performances of the cover 10.

Then, forming is carried out (FIG. 13) of the internal wall 35 of the seat 36 where a sealing gasket (not shown) will be housed; this internal wall 35 is placed externally with respect to the central drawn part 34.

Figure 14:
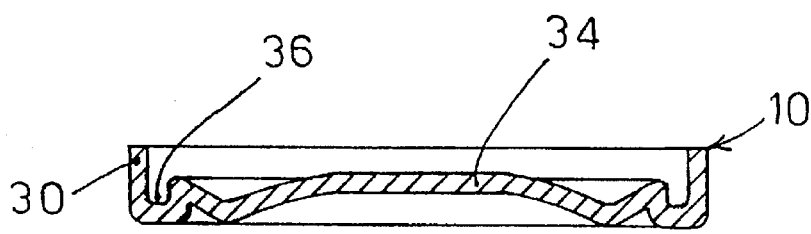
Figure 15:
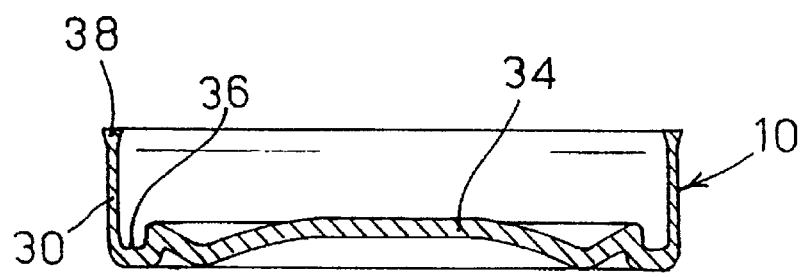
Figure 16:
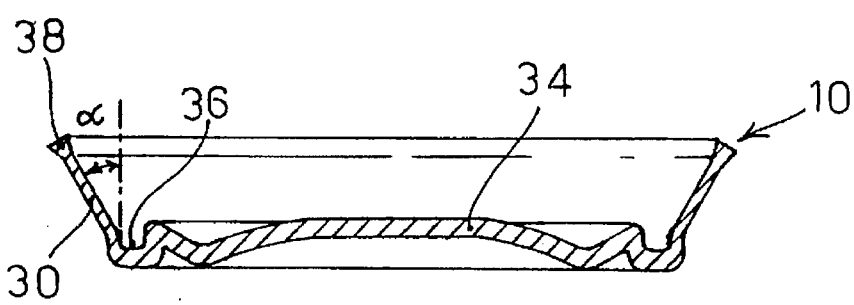
Figure 17:
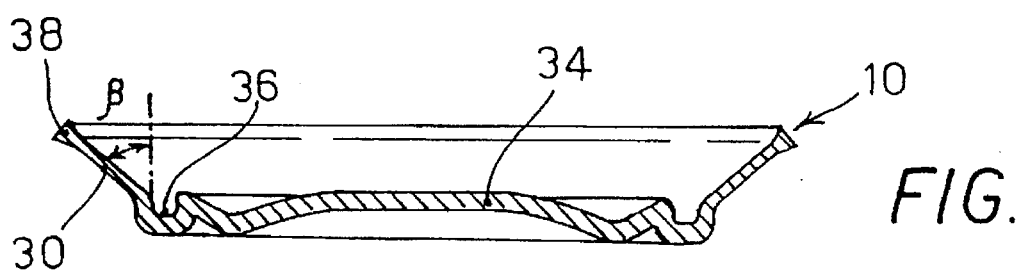
Figure 18:
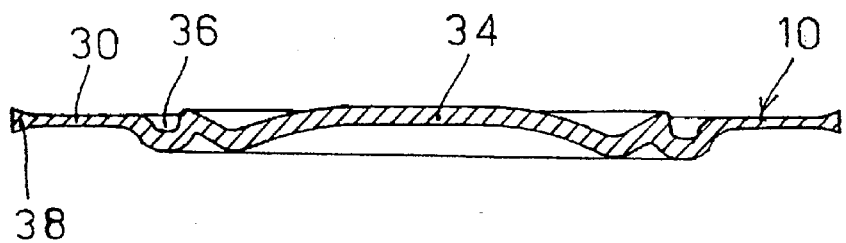
Figure 19:
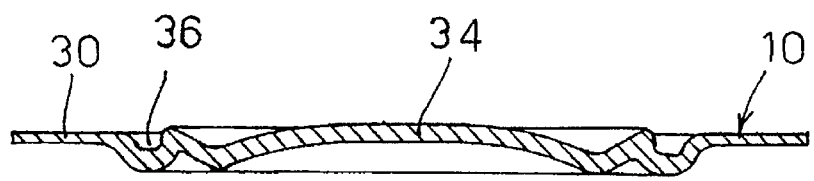
Figure 20:
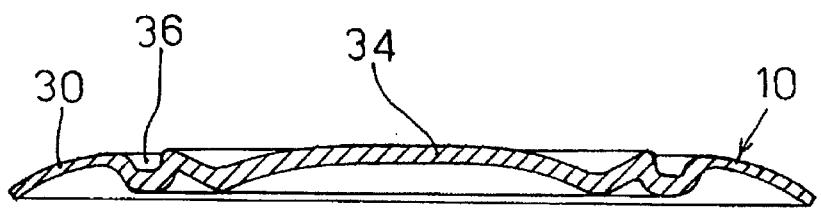
Figure 21:
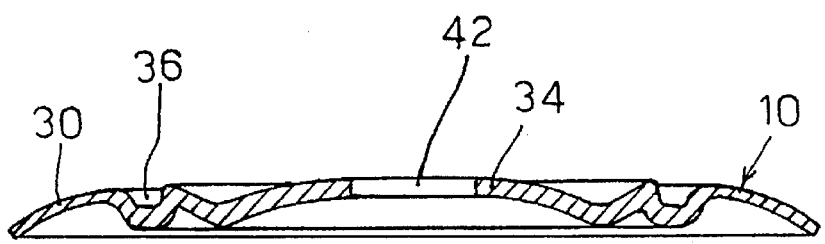
Figure 22:
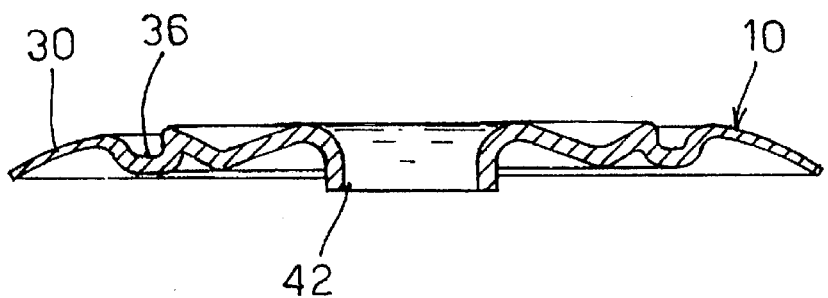

The central and inventive part of this third alternative process is reducing the thickness of the external edge 30 of the slab 10; this step is further divided into the following steps:

bending (FIG. 14) the external edge 30 at such an angle as to allow realizing the following extruding step and the forming step of the external wall of said gasket seat 36; this angle is equal to about 90°, that is, bending occurs so that the external edge 30 is placed vertically;

extruding (FIG. 15) an annular part of the external edge 30 till the thickness thereof is brought to the final operating value (about 0.8 mm or even less): this extruding step leaves an extreme circular crown 38 of the external edge 30 whose thickness is unchanged with respect to the initial one; purpose of this extreme circular crown 38 is avoiding that the material cracks during the following bending steps;

bending (FIG. 16) the external edge 30 for a first time in such a way as to form a first angle $\alpha$ with respect to the axis of the cover 10: after several experiments, it has been discovered that, for a better operating result, angle $\alpha$ ranges between 20° and 40°, and preferably between 25° and 35°, most preferably 30°; the first bending is realized in the opposite direction with respect to the one where bending in the previous step shown in FIG. 14 had been realized;

bending (FIG. 17) the external edge 30 for a second time in such a way as to form a second angle $\beta$, greater than the angle $\alpha$, with respect to the axis of the cover 10; after several experiments, it has been discovered that, for a better operating result, angle $\beta$ ranges between 40° and 60°, and preferably between 45° and 55°, most preferably 50°;

bending (FIG. 18) the external edge 30 for a third time in such a way as to bring it back to its initial position, that is substantially horizontal and at a right angle with respect to the axis of the cover 10; and trimming (FIG. 19) the external edge 30, thereby removing the extreme circular crown 38.

After having reduced the thickness to a value of about 0.8 mm or less, that allows an easy seaming thereof, the known steps are carried out of final forming (FIG. 20) the external edge 30 of the slab 10; punching (FIG. 21) the slab 10 in order to form the central hole 42; and turning the edge (FIG. 22) in the formed central hole 42 of the slab 10.

The last manufacturing steps for such cover are similar to the ones described above: they are threading the central hole 42 of the slab 10, and seaming the external edge 30 of the slab 10 to the filter-containing cup 14. These operations, being well known in the art, have not been described.

According to a variation (not shown) of this third alternative process, the extruding step can be carried out on an external circular crown whose height is greater than 17 mm., that is the minimum one under which cracks can occur (without the presence of said extreme circular crown) when performing afterwards the first bending step.

According to another variation of this third alternative process, the drawing, trimming and threading steps can be carried out before the step of reducing the thickness of the external edge 30: this because these steps are somewhat independent from the other ones and can be realized at any time during the process.

Finally, as further improvement of one of the steps of the present inventive process, the threading steps in all its alternatives can be carried out by removing chips, or by rolling, or in other equivalent ways.

The invention is further related to the single-component cover 10 manufactured employing one of the above-described alternative processes.

The single-component cover 10 for filters for vehicles thus manufactured and shown in the Figures is provided with inventive features with respect to similar covers designed or realized previously: in fact, none of the prior art single-component covers managed to stand the high operating pressures without breakages, or the processes to produce these prior art overs have always been too complex and too costly for mass production.

We claim:

1. A process for manufacturing a single-component cover for filters for vehicles said process including the steps of:

1) providing a starting single-component slab of a circular shape;

2) drawing by means of a press said slab in a central part thereof;

3) forming an internal wall of a gasket seat, said internal wall being placed externally with respect to said central drawn part;

4) reducing the thickness of an external edge of said slab, said thickness-reducing step further comprising the steps of:

4a) bending from an initial position said external edge at such an angle as to allow realizing a following extruding step and a forming step of an external wall of said gasket seat;

4b) extruding an annular part of said external edge till a thickness thereof is brought to a final value, said extruding step leaving an extreme circular crown of said external edge, said extreme circular crown having a thickness that is the same as the initial thickness of said external edge;

4c) bending said external edge for a first time in such a way as to form a first angle with respect to an axis of said cover, said first bending being realized in an opposite direction with respect to the direction where bending in the previous step had been realized;

4d) bending said external edge for a second time in such a way as to form a second angle with respect to the axis of said cover, said second angle being greater than said first angle;

4e) bending said external edge for a third time in such a way as to bring the external edge back to the initial position thereof, that is substantially horizontal and at a right angle with respect to the axis of said cover; and 4f) trimming said external edge thereby removing said extreme circular crown;

5) finally forming the external edge of said slab;

6) punching the slab in order to form a central hole;

7) turning an edge in the formed central hole of the slab;

8) threading said central hole of said slab; and 9) seaming said external edge of said slab to a filter-containing cup.

2. A process according to claim 1, wherein the angle of the bending step 4a) is approximately equal to 9°.

3. A process according to claim 1, wherein said first angle of said first bending step 4c) ranges between 20° and 48°.

4. A process according to claim 1, wherein said second angle of said second bending step 4d) ranges between 40° and 60°.

5. A process according to claim 1, wherein said extruding step 4b) is carried out on an external circular crown with a height greater than 17 mm.

6. A process according to claim 1, wherein said drawing step 6), said trimming step 7) and said threading step 8) are carried out before said step 4) of reducing the thickness of said external edge.

7. A process according to claim 1, wherein said threading step 8) is carried out by removing chips.

8. A process according to claim 1 wherein said threading step 8) is carried out by rolling.

9. A process according to claim 1, wherein said first angle of said first bending step 4c) ranges between 25 degrees and 35 degrees.

10. A process according to claim 1, wherein said second angle of said second bending step 4d) ranges between 45 degrees and 55 degrees.

* * * * *